United States Patent
Buddemeier et al.

(10) Patent No.: US 9,792,304 B1
(45) Date of Patent: Oct. 17, 2017

(54) QUERY BY IMAGE

(71) Applicant: Google Inc., Mountain View, CA (US)

(72) Inventors: Ulrich Buddemeier, Venice, CA (US); Gabriel Taubman, Brooklyn, NY (US); Hartwig Adam, Los Angeles, CA (US); Charles J. Rosenberg, Cupertino, CA (US); Hartmut Neven, Malibu, CA (US); David Petrou, Brooklyn, NY (US); Fernando Brucher, Irvine, CA (US)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 14/946,027

(22) Filed: Nov. 19, 2015

Related U.S. Application Data

(60) Continuation of application No. 14/301,154, filed on Jun. 10, 2014, now Pat. No. 9,201,903, which is a division of application No. 12/960,413, filed on Dec. 3, 2010, now Pat. No. 8,761,512.

(60) Provisional application No. 61/266,503, filed on Dec. 3, 2009.

(51) Int. Cl.
*G06F 17/30* (2006.01)

(52) U.S. Cl.
CPC .... *G06F 17/30277* (2013.01); *G06F 17/3053* (2013.01); *G06F 17/30256* (2013.01); *G06F 17/30554* (2013.01)

(58) Field of Classification Search
CPC ........ G06F 17/30268; G06F 17/30277; G06K 2209/01; G06K 9/6215; G06K 9/6282; G06K 9/723
See application file for complete search history.

(56) References Cited

U.S. PATENT DOCUMENTS

| | | |
|---|---|---|
| 5,706,365 A | 1/1998 | Rangarajan et al. |
| 5,943,443 A | 8/1999 | Itonori et al. |
| 7,031,555 B2 | 4/2006 | Troyanker |
| 7,136,876 B1 | 11/2006 | Adar et al. |
| 7,624,337 B2 | 11/2009 | Sull et al. |
| 7,925,498 B1 | 4/2011 | Baker et al. |
| 7,949,191 B1 | 5/2011 | Ramkumar et al. |
| 8,417,713 B1 | 4/2013 | Blair-Goldensohn et al. |
| 8,761,512 B1 | 6/2014 | Buddemeier et al. |
| 2002/0150300 A1 | 10/2002 | Lee et al. |
| 2005/0002568 A1 | 1/2005 | Chupeau et al. |
| 2007/0271226 A1* | 11/2007 | Zhang et al. ..... G06F 17/30265 |
| 2010/0036818 A1 | 2/2010 | Valencia-Campo et al. |
| 2011/0188742 A1 | 8/2011 | Yu et al. |

OTHER PUBLICATIONS

Wan, Xiaojun, "Improved Affinity Graph based Multi-Document Summarization," Jun. 2006, Proceedings of Human Language Technology Conference of the North American Chapter of ACL, pp. 181-184, New York.

* cited by examiner

*Primary Examiner* — Siamak Harandi
(74) *Attorney, Agent, or Firm* — Fish & Richardson P.C.

(57) ABSTRACT

Methods, systems, and apparatus, including computer programs encoded on computer storage media, for processing queries made up of images. In one aspect, a method includes indexing images by image descriptors. The method further includes associating descriptive n-grams with the images. In another aspect, a method includes receiving a query, identifying text describing the query, and performing a search according to the text identified for the query.

20 Claims, 6 Drawing Sheets

QUERY BY IMAGE

CROSS-REFERENCE TO RELATED APPLICATIONS

This application is a continuation of, and claims priority to U.S. patent application Ser. No. 14/301,154, for Query by Image, filed on Jun. 10, 2014, which is a divisional application of, and claims priority to, U.S. patent application Ser. No. 12/960,413 filed on Dec. 3, 2010, which claims the benefit under 35 U.S.C. §119 of U.S. Provisional Application Ser. No. 61/266,503, filed on Dec. 3, 2009, all of which are incorporated herein by reference.

BACKGROUND

This specification relates to image search using query images.

Search engines aim to identify resources (e.g., images, audio, video, web pages, text, or documents) that are relevant to a user's needs and to present information about the resources in a manner that is most useful to the user. Search engines return a set of search results in response to a user submitted query. For example, in response to an image search text query (i.e., a query to identify image resources), the search engine returns a set of search results identifying image resources responsive to the query (e.g., as a group of thumbnail representations of the image resources). Typically, queries are text queries, e.g., queries having one or more search terms or query phrases.

SUMMARY

This specification describes technologies relating to image search using query images.

In general, one aspect of the subject matter described in this specification can be embodied in methods that include the actions of receiving a group of images, each image having associated metadata; building an initial index using local descriptors generated for each image of the group of images; generating a set of matching images for each image using the initial index; using the set of matching images to determine pairwise image affinity and final image selection; calculating a set of n-grams and corresponding n-gram scores for each image using image affinity and image metadata; and generating a final index using images for the final image selection and including corresponding n-grams for each image. Other embodiments of this aspect include corresponding systems, apparatus, and computer programs recorded on computer storage devices, each configured to perform the operations of the methods.

These and other embodiments can each optionally include one or more of the following features. The method can further include, for each image, generating local descriptors for each of multiple regions of interest within the image. The matched images can have a score that is correlated to a visual similarity between matching images. Using the set of matching images to determine pairwise image affinity includes generating an undirected graph using the set of matching images and where determining the pairwise image affinity comprises calculating a maximum affinity path between any two images in the graph. Determining a final image selection can include identifying a value for a selection flag of each image in the graph according to a calculated maximum yield over the entire graph. The n-grams for each image and the associated n-gram scores can be calculated using the image metadata and image affinity. The image metadata can include a number of clicks for the image associated with a query phrase.

In general, another aspect of the subject matter described in this specification can be embodied in methods that include the actions of receiving an image as a query; deriving a textual query corresponding to the received image using n-grams associated with similar images to the received image; obtaining search results responsive to the textual query; and presenting one or more of the obtained search results. Other embodiments of this aspect include corresponding systems, apparatus, and computer programs recorded on computer storage devices, each configured to perform the operations of the methods.

These and other embodiments can each optionally include one or more of the following features. The image can be received from a mobile device. Deriving the textual query corresponding to the image can include obtaining a group of similar images for a particular image, each similar image associated with one or more n-grams; determining an overall score for one or more of the n-grams; and selecting one of the n-grams as a description of the particular image. The search results can be image search results.

In general, another aspect of the subject matter described in this specification can be embodied in methods that include the actions of obtaining a group of similar images for a particular image, each similar image associated with one or more n-grams; determining an overall score for one or more of the n-grams; and selecting one of the n-grams as a description of the particular image according to the overall scores for the one or more n-grams. Other embodiments of this aspect include corresponding systems, apparatus, and computer programs recorded on computer storage devices, each configured to perform the operations of the methods.

These and other embodiments can each optionally include one or more of the following features. Obtaining a group of similar images for a particular image can include querying an index that associates images with descriptors. The method can further include storing a database associating each image with one or more n grams. Each n-gram associated with an image can have an image-specific score.

Determining an overall score for an n-gram can include combining each image-specific score for the n-gram. The overall score for an n-gram can be based on a sum of the image-specific scores for the n-gram divided by a total number of images associated with the n-gram. The method can further include filtering one or more of the n-grams according to a blacklist of terms. The method can further include filtering one or more of the n-grams to remove n-grams that contain stop words.

Selecting one of the n-grams can include selecting a current best n-gram from one or more 1-grams in the one or more n-grams, where the current best n-gram has a highest overall score of all of the one or more 1-grams in the one or more n-grams; considering each other highest overall scoring n-gram of all of one or more n-grams at each order of n-grams greater than 1 in increasing order, and determining, for each highest overall scoring n-gram at a given order whether to update the current best n-gram to be the highest overall scoring n-gram of the order, where the current best n-gram is updated when the highest overall scoring n-gram of the order has a higher overall score than a score associated with the current best n-gram or when the highest overall scoring n-gram is a superstring of the current best n-gram and has a score that satisfies an acceptance threshold. The method can further include updating the current best n-gram to be the determined highest overall scoring n-gram of the order when it is determined that the current best n-gram should be updated. Updating the current best n-gram can include associating a score with the updated current best n-gram, wherein the score is the overall score of the updated current best n-gram when the updated current best n-gram has an overall score that is higher than the score associated with the previous best n-gram, and otherwise is the score of the previous best n-gram.

In general, another aspect of the subject matter described in this specification can be embodied in a data processing apparatus, comprising a first memory store, the first memory store storing a tree, the first tree having a root node, a plurality of child nodes, and leaf nodes descending from the child nodes; and a plurality of second memory stores, each second memory store storing one of a plurality of second trees, each second tree being a tree having a root node corresponding to one of the leaf nodes of the first tree, and each second tree including a plurality of child nodes and leaf nodes descending from its child nodes, wherein each leaf node in each second tree corresponds to a query vector.

These and other embodiments can each optionally include one or more of the following features. The first memory store can be a random access memory in a first computer, and each second memory store can be a random access memory on a respective second computer of a plurality of second computers that correspond to the plurality of second memory stores. The first tree can be a binary tree having a depth d, and the plurality of second trees can consist of $2^d$ second trees.

In general, another aspect of the subject matter described in this specification can be embodied in methods that include the actions of selecting a proper subset of elements from a set of elements; building a first tree using the proper subset of elements, the first tree having a root node, a plurality of child nodes and leaf nodes descending from the child nodes; associating each element in the set of elements with a corresponding child node so that each child node has a unique set of associated elements from the set of elements; and for each child node, building a second tree using the associated elements associated with the child node, the second tree having a root node, a plurality of child nodes and leaf nodes descending from the child nodes, wherein each leaf node in each second tree corresponds to a query vector. Other embodiments of this aspect include corresponding systems, apparatus, and computer programs recorded on computer storage devices, each configured to perform the operations of the methods.

These and other embodiments can each optionally include one or more of the following features. The method can further include receiving a query vector; identifying a proper subset of child nodes of the first tree that are most similar to the query vector; providing the query vector to each of the second trees that correspond to the proper subset of child nodes; for each second tree, identifying a proper subset of child nodes of the second tree that are most similar to the query vector, wherein each child node of the second tree corresponds to an indexed vector; and ranking the indexed vectors that are identified for each second tree based on the similarity of each indexed vector to the query vector.

Particular embodiments of the subject matter described in this specification can be implemented so as to realize one or more of the following advantages. An image index is generated that provides for efficient and accurate retrieval of images responsive to a given image as a query. Users can submit queries as images, rather than as text. This allows users to submit queries, for example, to find other information relevant to a particular image, even if the user is not sure of the best way to describe the image. This also allows users to submit queries in situations where entering text would be cumbersome, for example, on a mobile device keyboard or touch input interface.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
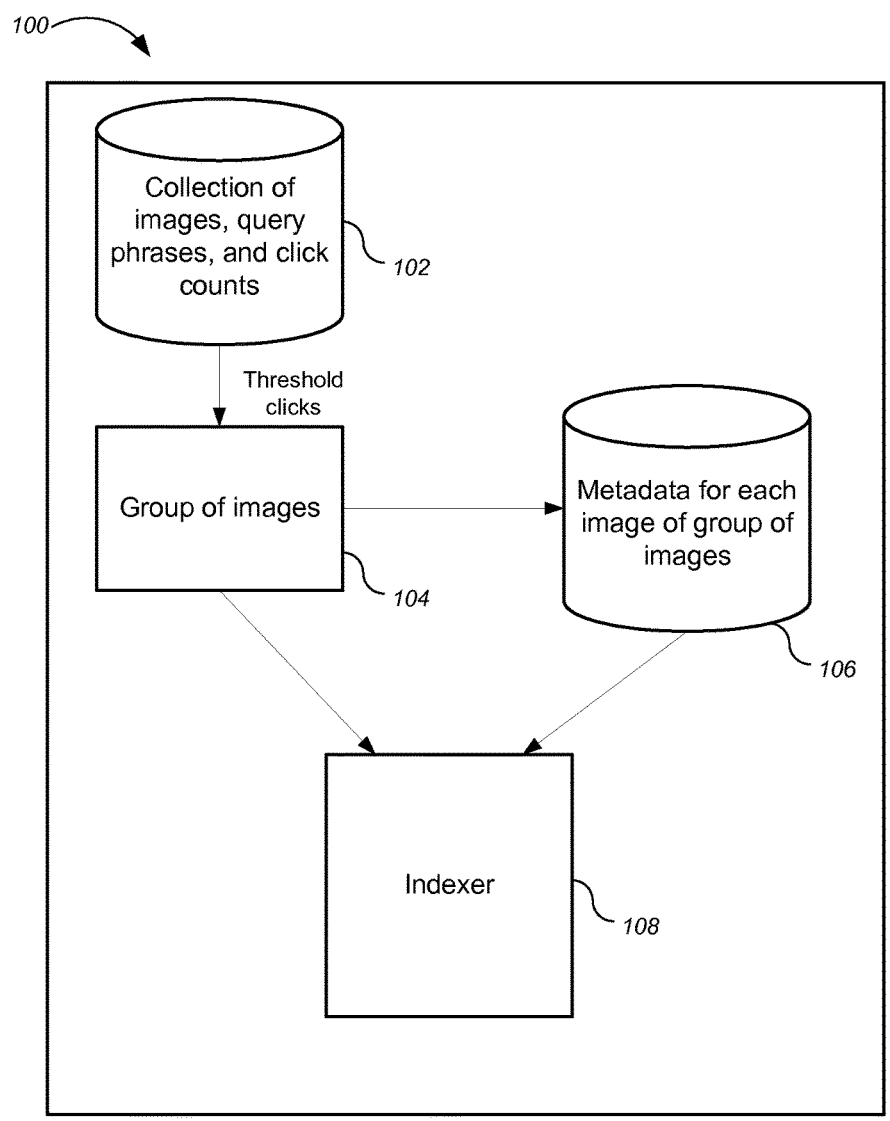
FIG. 1 is a block diagram of an example system for generating a searchable index of image content.

FIG. 1 is a block diagram of a system 100 for generating a searchable index of image content. The system 100 includes an image database 102. The image database 102 includes a collection of images. The collection of images includes images collected from various resources, for example, web pages and other network documents. In some implementations, the images are extracted from documents while in some other implementations, the images are stand alone images, for example, from an image repository. In particular, the collection of images can correspond to images that have been selected by one or more users when provided in response to an image search text query.

The image database 102 also includes query phrases and a count of selections ("clicks") that each corresponding image in the collection received when identified in response to the query phrase. A query phrase can be part of or all of a submitted text query where a longer text query can be segmented into query phrases.

For example, if the query phrase "Eiffel Tower" is submitted as, or part of, a text query to a search system, the search system can identify a number of image resources as image results. These image results can be presented, for example, as thumbnail representations of the corresponding resources. A user can select, e.g., by clicking on with an input device or tapping on a touchscreen interface, a particular thumbnail representation in order to view the corresponding image. For each selected image there can be one or more corresponding query phrases that result in the image being identified in search results.

The collection of images from the image database 102 is filtered to identify a group of images 104 satisfying a particular threshold number of clicks. For example, the group of images can include only those images from the collection of images that received at least a threshold number of clicks when a representation of the image is presented in search results.

For each image in the image database 102, metadata is identified and stored in a metadata database 106. The metadata database stores, for each image, query phrases each having a corresponding count of selections received (referred to as "clicks" throughout the specification for convenience though this applies to other types of selections generally), referrers, and text snippets from the referrers. Referrers are uniform resource locators "URLs" of web pages that contain or link to the image. Text snippets can include snippets that describe the web pages themselves or that are physically close to the image. Text snippets can also include anchor text for links to the image. Other text associated with the image can also be stored in the metadata database, for example, user-defined labels describing the image.

The group of images 104 and the metadata in the metadata database 106 are both used by an indexer 108 to generate a searchable index for images in the group of images 104. Generating the searchable index is described in greater detail below with respect to FIG. 2.

Figure 2:
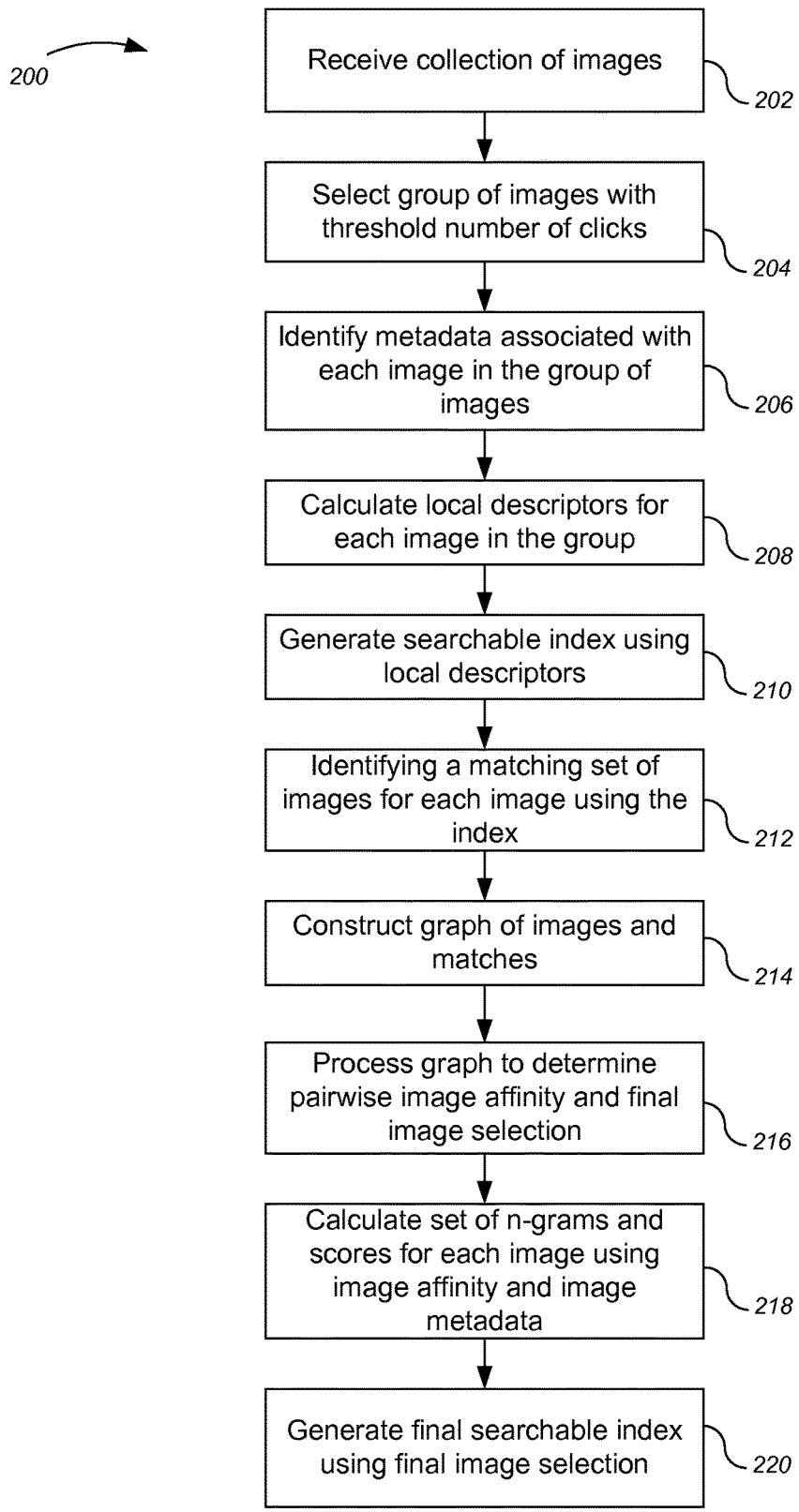
FIG. 2 is a flow chart showing an example method for generating a searchable index of image content.

FIG. 2 is a flow chart showing an example method 200 for generating a searchable index of image content. The index generated by the method 200 indexes image descriptors. Each image descriptor is associated with an image. The method 200 can further identify n-grams to associate with one or more of the images whose descriptors are indexed.

The method 200 can be performed, in some implementations, by one or more components of a system of one or more computing devices, e.g., the system component can be the indexer 108 of system 100 shown in FIG. 1. Therefore, for convenience, the example method 200 will be described in reference to a system that performs the method 200.

The system receives 202 a collection of images. The collection of images can be generated by collecting images from various network sources, e.g., as described above with respect to the image database 102.

The system uses the collection of images to select 204 a group of images satisfying a threshold number of clicks. The number of clicks corresponds to the number of times a representation of the image presented as part of image search results was selected by a user in response to a text query.

For each of the images in the group of images, the system identifies 206 associated metadata. The metadata associated with an image can include, for example, query phrases and the corresponding count total of received clicks, referrers, and text snippets from the referrers, as set forth above with respect to FIG. 1.

Additionally, for each image of the group of images the system calculates 208 one or more local descriptors. Each local descriptor for an image represents an abstract description of a local area in an image.

The system can generate local descriptors for a given image by first dividing the image into multiple regions. The regions can be identified regions of interest. A region of interest can be specified by its location, scale, and orientation. The regions can then be normalized so that the normalized regions have a same orientation and size as a pre-determined reference region. For example, similarity or affine transforms can be applied to the regions to normalize them. In particular, the normalization can include rotating or rescaling the region. In some implementations, the local regions are scaled to a specified reference region that matches generated wavelets, which are described in more detail below.

The system generates one or more wavelets using the dimensions and orientation of the normalized regions. Wavelets are functions that resolve data into different frequency components and then analyze each component with a resolution matched to its scale. In some implementations, Gabor wavelets are used.

The system calculates one or more dot products between each of the one or more wavelets, respectively, and the normalized regions. The results of each dot product provides a local descriptor vector for the corresponding region of the image. Thus, a local descriptor is calculated for each region of interest in the image. In some implementations, the dot product is calculated to retain phase information. The calculated values are used as entries in a local descriptor vector for the image.

In some implementations, the system concatenates amplitudes of the one or more dot products to generate the local descriptor vector representing each region of the image. The use of amplitudes can reduce error effects caused, for example, by localization errors of regions in the image. Additionally, the local descriptor vectors generated through concatenation of amplitudes can be used to generate a disparity value. Disparity refers to displacement in an image required to obtain an optional match between local regions of different images. Computation of a disparity value can, for example, reduce localization errors.

Additionally, in some implementations the local descriptor vectors are normalized, for example, to maintain constant L-norms. Further, the local descriptor vectors can be compressed to reduce the number of dimensions present in each vector. For example, the dimension of the vectors can be reduced by using principal component analysis. These local descriptor vectors for the group of images can then be used to generate a searchable index of local descriptor vectors.

The system generates 210 an initial searchable index of the group of images using the local descriptor vectors. The initial searchable index indexes the one or more local descriptor vectors generated for each image of the group of images. Additionally, each local descriptor vector, or data associated with the local descriptor vector, can identify the corresponding image such that for any individual local descriptor in the index, the source image can be identified.

Various techniques to generate the initial searchable index can be used. A particular indexing technique can be selected such that given a large set of images and a query image the searchable index returns all images in the large set that are visually similar to the query image. The index also provides for the similarity of images to be qualified with a score e.g., a score in the range [0, 1].

For example, the index can be built as follows. For each of the selected images, a set of local descriptors is computed. From these descriptors, a searchable index is built. In general, the searchable index, given a large set of images and a query image, is used to identify images in the set that are visually similar to the query image and to quantify the similarity of the returned images.

In some implementations, a distributed kd-tree structure is used for the searchable index. While the example searchable index described below is built from a kd-tree structure, other types of searchable indexes can also be used.

A kd-tree is distributed across computing devices by creating $2^d$ sub-trees at a level, or depth, d in the kd-tree. The sub-trees at each node at depth d include all of the respective descendants from the node. The nodes at a depth less than d (the remaining "tree stump") are used to decide which sub-trees are queried for each descriptor (query vector).

Given a very large set of N-dimensional vectors to be searched (e.g., each representing an individual local descriptor from an image), a sample subset is drawn from the set and the tree stump (a kd-tree with fixed depth d) is built from the sample. The tree stump is then used to partition the original set of N-dimensional vectors into $2^d$ partitions by assigning every sample vector to the leaf node that contains the sample vector. The partitioned kd-trees are built from each partition of vectors. In some implementations, each partitioned tress is hosted on one machine.

Once built, this distributed data structure is searched by first determining all leaves on the tree-stump within a certain maximum distance from the query and then sending the query to the kd-trees corresponding to these leaves for processing. Once results are retrieved from all leaves, the results are combined and ranked. This combination and ranking results in a set of images that are most closely related to the query.

Figure 3:
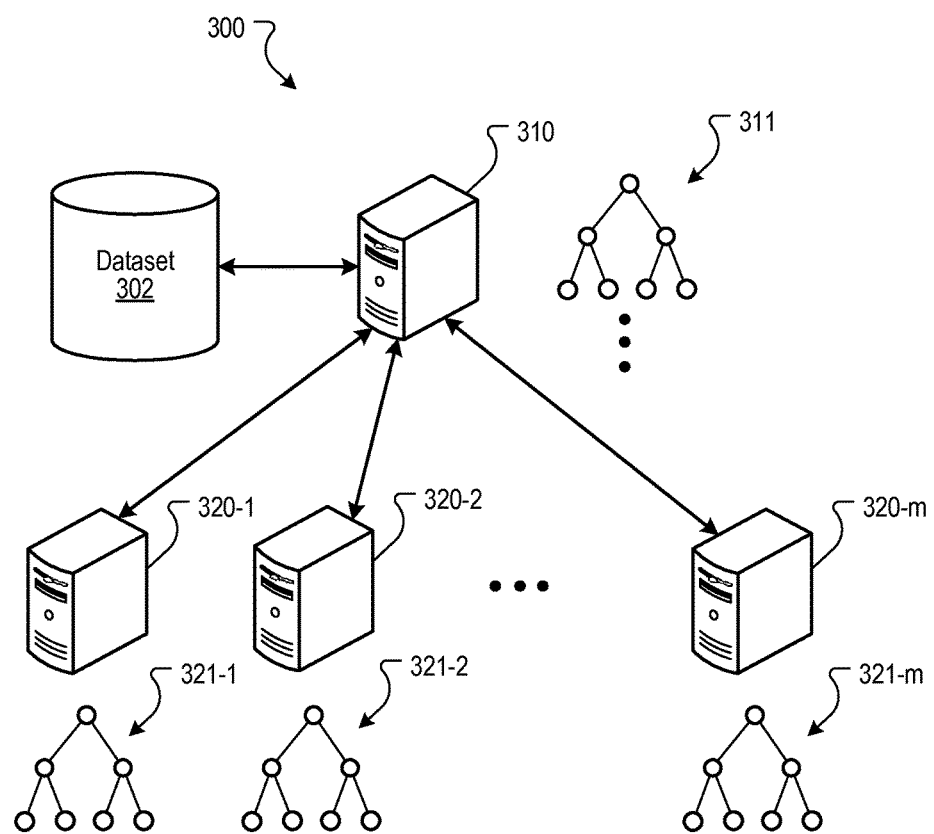
FIG. 3 is a block diagram of an example distributed kd-tree infrastructure.

FIG. 3 is a block diagram of an example distributed kd-tree infrastructure 300. The distributed kd-tree infrastructure 300 includes a first tree 311 and multiple sub-trees 321-1 ... 321-m. In the example infrastructure shown, the tree stump 311 is a kd-tree of depth d, and thus there are $2^d$ sub-trees 321-1 ... 321-m, i.e., m=$2^d$. In some implementations, each sub-tree 321 is configured to be of a size that can be stored in a random access memory (RAM) of a single computer device 320. Likewise, in some implementations, the tree stump is configured to be of a size that can be stored in the RAM of the computer device 310.

In general, each leaf node in the sub-tress 321-1 ... 321-m corresponds to one element in a dataset 302. For example, for the system described herein, each leaf node in the sub-trees 321-1 ... 321-m corresponds to an N-dimensional query vector of descriptors. The tree stump 311 is used to determine which sub-tree(s) 321 a received query vector is to be sent for processing. The distributed kd-tree infrastructure 300 can also be used to index other types of data, however.

Figure 4:
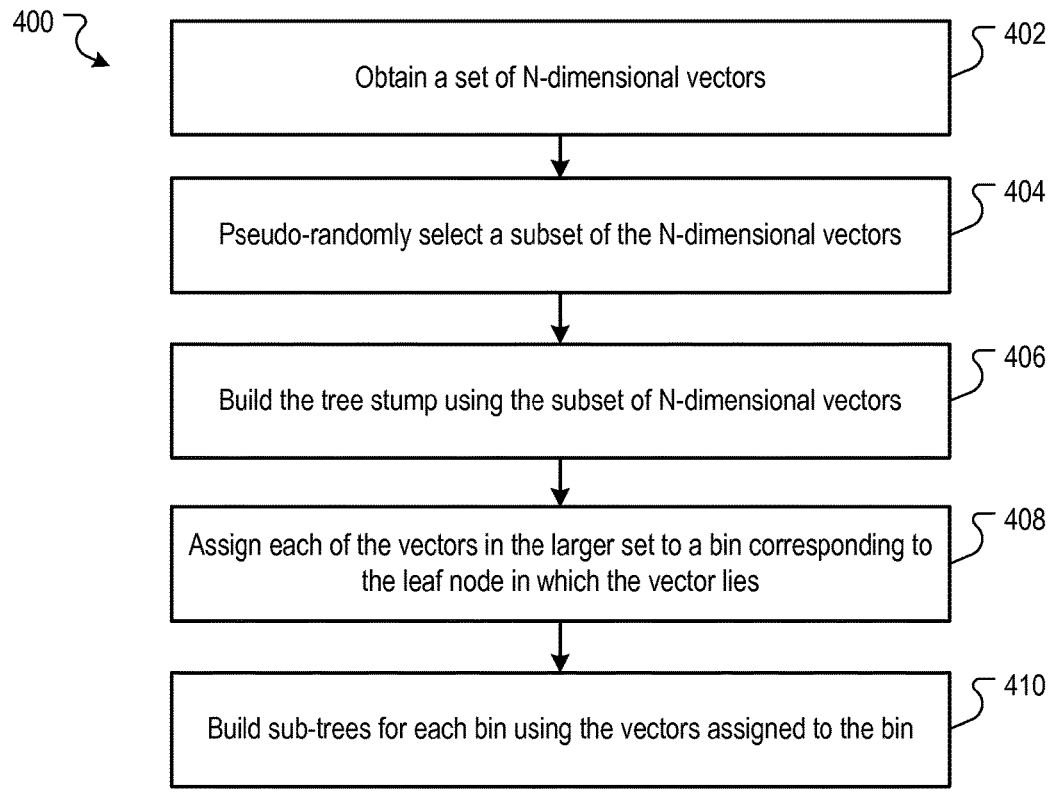
FIG. 4 is a flow chart showing an example method for constructing a distributed search structure.

FIG. 4 is a flow chart showing an example method 400 for constructing a distributed search structure. The method 400 can be performed, in some implementations, by one or more components of a system including one or more computing devices, e.g., one or more of the computers of FIG. 3. Therefore, for convenience, the example method 400 will be described in reference to a system that performs the method 400.

The system obtains 402 a set of N-dimensional vectors. Each vector corresponds to a local descriptor for an image. In some implementations, for partitioning purposes, N is considered large if a full set of N vectors cannot be stored in the RAM of a single machine. From this set, the system selects 404 a smaller number of vectors. In some implementations, the selection is performed pseudo-randomly or randomly. In particular, the system can pseudo-randomly select a proper subset of vectors to reduce the likelihood of biasing the resulting trees stump that is to be built.

The system uses 406 this proper subset of vectors to build the tree stump for a kd-tree. The tree stump (a kd-tree with fixed depth d) can be built by any conventional kd-tree building algorithm. One example method uses splitting planes and point insertion to construct the kd-tree. The system cycles through axes that are used to select splitting planes, and inserts points by selecting the median of the points that are to descend from a node with respect to their coordinates in the axis being used to create the splitting plane. Other kd-tree building algorithms can also be used.

As the tree stump is limited to d levels, it contain $2^d$ leaf nodes. Each leaf node corresponds to a hyper-rectangle in the M-dimensional space.

Once the tree stump is built, the system assigns 408 each of the vectors in the larger set to a bin corresponding to the leaf node in which the vector lies. The assignment of the vectors to a bin is described below. The assignments of the vectors partitions the set of N vectors into $2^d$ bins with approximately equal vector counts. Because the initial sample used to build the tree stump may not exactly reflect the actual distribution of vectors in the set, the 2d bins typically do not have exactly equal vector counts.

The system builds 410 a kd-tree from the vectors in each bin. The kd-trees built from the vectors in each bin are the sub-trees 321 As with the tree stump, each sub-tree can be built by any conventional kd-tree building algorithm. In some implementations, each leaf of each sub-tree corresponds to only one vector from the dataset 302 (e.g., a single local descriptor), and each sub-tree 321 is hosted by only one machine 320.

The structures of the tree stump 311 and the $2^d$ sub-trees 321 define the distributed kd-tree. In some implementations, each sub-tree is associated with only one leaf of the tree stump, and thus the structures of the tree stump and the $2^d$ sub-trees form a complete tree structure.

To find nearest neighbors, the sub-tree in which the query descriptor belongs and all k−1 sub-trees, with k≤m (the maximum number of sub-tree searches per query), are searched. Each of the k−1 sub-trees are also sub-trees whose root is on a path where the distance of the query descriptor to the splitting plane of the node where a "wrong" direction was taken is below a given threshold. The results are combined from each tree to return the closest set of nearest neighbors, e.g., the closest set of descriptors.

Figure 5:
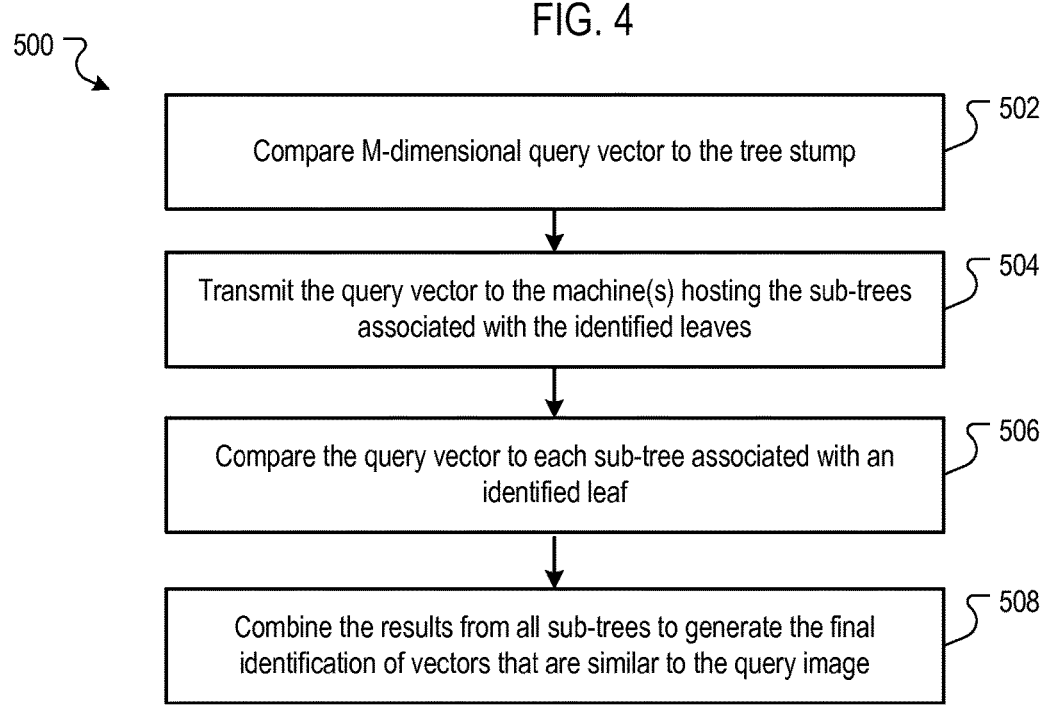
FIG. 5 is a flow chart showing an example method for an approximate nearest neighbor search on the distributed search structure.

FIG. 5 is a flow chart showing an example method 500 for an approximate nearest neighbor search on the distributed search structure. The method 500 can be performed, in some implementations, by one or more components of a system, e.g., using one or more of the computers of FIG. 3. Therefore, for convenience, the example method 500 will be described in reference to a system that performs the method 500. The nearest neighbor search identifies, for example, images that are visually similar to a given image.

Given a single M-dimensional query vector for a particular local descriptor of an image, the system compares 502 the vector against the tree-stump. The comparison identifies all leaves of the tree stump that may contain vectors within a certain radius of the query vector. In some implementations, the comparison is done by a process that is similar to the assignment of the vectors to the bins, and is described below.

The system transmits 504 the query vector to the machines hosting the sub-trees associated with the identified leaves. For example, the computer 310 is in data communication with the computers 320-1 ... 320-m, and transmits the query vector to the computers that correspond to the identified sub-trees 321.

The system compares 506 the query vector against each sub-tree to identify approximate nearest neighbors (e.g., descriptors), and the approximate nearest neighbors are returned. In some implementations, the nearest neighbors are found using a recursive nearest neighbor search. However, the recursion can be limited to searching within each sub-tree 321 that received the query vector, and thus candidate nearest neighbors are found in parallel in each of the sub-trees 321 that were selected to process the query vector.

The system combines 508 the results from all sub-trees for all of the query vectors of the query image to generate the final identification of descriptors that match the query vector.

The process of assigning vectors to bins ("binning vectors") is similar to the process of selecting sub-tress to process a received query vector. When binning a vector, the tree stump is traversed and only one leaf node of the tree stub 311 is identified, as that is the leaf node associated with vectors that will be used to generate the eventual sub-tree 321 that "descends" from the leaf node. When selecting sub-trees to process a received query vector, the tree stump is traversed in a similar manner and a list of one (or more) sub-trees is generated, and the query vector is then sent to those identified sub trees.

The process of binning vectors is, in some implementations, a series of depth first searches on the tree stump 311. Each search yields one entry in a result set S. During each search, the forks not taken are pushed onto a priority queue. Each subsequent search begins at the fork with the highest priority, which is the closest "near miss" in terms of descriptor distance (or other vector element) encountered thus far.

In particular, the parameters for the process include an input vector v[i], a tree stump with d levels, a split value m[j], and a split dimension x[j], where $j=1 \ldots 2^d$. For any node j, the child nodes of a node indexed by j are j(2) and j(2+1).

A maximum number of sub-trees L is also defined. L is set to 1 when binning, and L is set to a value greater than 1 when selecting sub-trees to process a query vector. Additionally, a maximum distance dist_max is also set, and defines the maximum distance between the space occupied by a sub-tree and the input vector v[i].

For binning, the process outputs an index of a sub-tree 321, e.g., S={s}, where s is one of $1 \ldots 2^d$. For searching an input vector, the process outputs a list of sub-tree 321 indexes, $S=\{s_1 \ldots s_k\}$, wherein $1<k<2^d$.

An empty priority queue q of indices is defined, and which will hold indices sorted by increasing distance. An empty set S is defined, and j is set initially to 1.

While the number of elements in S is less than L the process will process the input vector v[i]. While j is less than $2^d$, a distance value dist is determined, where dist=v[x[j]]−m[j]. In some implementations, this distance is the signed distance to the separation plane at the node j.

If the distance value dist is less than a threshold (for example, if dist is negative when the threshold is zero), and if the absolute value of the distance value dist is less than the maximum distance dist_max, then the child node corresponding to j*2+1 is inserted into the priority queue with a corresponding distance of |dist|.

Conversely, if the distance value dist is not less than the threshold (for example, if dist is positive when the threshold is zero), and if the absolute value of the distance value dist is less than the maximum distance dist_max, then the child node corresponding to j*2 is inserted into the priority queue with a corresponding distance of |dist|, and the value of j is incremented by 1.

The next value dist is determined, and the process continues until j is equal to or greater than $2^d$. When this condition occurs, the current node indexed by j is added to the list index of sub-trees, i.e., the value of $j-2^d$ is inserted into the set S. If the queue is empty or the maximum sub-tree limit L is hit, the process ends, otherwise j is set to the top value pulled from priority queue q and the process continues.

This process described above for assigning vectors to bins can be written in pseudocode, for example, as:

q←empty priority queue of indices, sorted by increasing distance
S←empty set
j←1//i.e. root node of tree stump)
while number of elements in S<I do
  while j<2^d do
    dist←v[d[j]]−m[j]//signed distance to separation plane at node j
    j←j*2//first child node
    if dist<0
      //inserts other child node into queue, continues with j
      if |dist|<dist_max insert j+1 into priority queue at distance |dist|
    else
      //inserts this (j) child node into queue, continues with j+1
      if |dist|<dist_max insert j into priority queue at distance |dist|
      j←j+1
  insert j−2^d into S//inserts shard index into result set.
  if q is empty end
  //obtains next node to start with from queue, i.e. node in queue with smallest distance.
  j←top of q
  remove top of q
end As shown in FIG. 2, the system identifies 212 as set of matching images for each image of the group of images using the initial searchable index. The matches are qualified by a score that is correlated to a visual similarity between matching images. In some implementations, the score has a value in the range [0, 1]. Various techniques for identifying similarity can be used. One technique for identifying similar images is described in David G. Lowe, "Object Recognition from Local Scale-Invariant Features," iccv, vol. 2, pp. 1150, Seventh International Conference on Computer Vision (ICCV'99)—Volume 2, 1999.

In general, this technique includes finding a number of nearest neighbors for each of the local descriptors of a query image (e.g., according to the index), for example, as described above with reference to FIG. 5. The nearest neighbors are then binned by the indexed image to which they belong. For each indexed image that yielded at least three such nearest neighbors in the process, the system examines the geometric relation of the local areas corresponding to the descriptors in the query image and the local areas corresponding to the found nearest neighbors in the index image. Essentially, the process establishes area-to-area correspondences between query and indexed image. The system looks for multiple correspondences (e.g., more than a threshold number of correspondences, for example, three) that agree (using agglomerative clustering) on the same geometric relation. The number of correspondences found in this way, relative to the total number of descriptors in the query image, indexed image, and total index determines the score based on an inverse-Bayes formula.

The matching technique can be modified from those described in Lowe in that the local descriptors described above are used instead of the descriptors described in Lowe. Additionally, in some implementations, agglomerative clustering on a distance metric between affine transforms is used in place of the inverse Hough transform.

The system uses the group of images and their respective matches to generate 214 an undirected graph. The undirected graph has images from the group of images as vertices and matches between images as edges between images. The edges can be weighted according to the match scores (e.g., each edge has a weight in the range [0, 1]).

The system processes 216 the graph to determine pairwise image affinity and to determine a final image selection. The pairwise image affinity is calculated by identifying a maximum affinity path between any two images in the graph within a specified number of hops (edges) apart (e.g., three hops). The image affinity is defined as the product of the edge weights (i.e., match scores) along the path. For example, if the distance between image i and image j is two hops, the first hop along an edge having a weight of 0.6 and the second hop having a weight of 0.2, then the affinity between images i and j is equal to (0.6)(0.2)=0.12. Identifying a maximum affinity path between images is analogous to a general shortest path problem for an undirected graph. The maximum affinity path can be solved in a similar manner to the general shortest path problem, for example by using Dijkstra's algorithm.

The system also processes 216 the graph to identify the final image selection. The images in the final image selection are those that will be used to generate a new searchable index. Each image in the graph includes a selection flag, $s_i$. The selection flag has a value of 0 or 1, where a value of 1 means the image is included in the final selection. In some implementations, the selection flag for each image is initially set to 1. As described above, the edges of the graph each have a weight $w_{ij}$. Thus, the weights $w_{ij}$ connect each image i with an image j. Additionally, the weight of an image with respect to itself, $w_{ii}$ can be defined as equal to 1.

A yield over the entire graph can be calculated where the yield Y is defined by:

$$Y := \text{Sum}_i (\max_j(s_j)(w_{ij})) - (\text{selection cost})(s_i).$$

Maximizing the yield results in the selection of images that have the maximum resolving power for searches. For example, the selection of a set of images that most likely will be responsive to any possible user search. Specifically, if a particular image is not selected, the addition to the yield is equal to the maximum edge value of that image to an image that is selected. However, if a particular image is selected, the addition to the yield is equal to 1-selection cost. The selection cost is a predetermined penalty applied to the yield whenever an image is selected (e.g., added to the set of final images that will be included in the searchable index).

For example, if two pictures of the Eiffel Tower at night are connected in the graph with high weight, having both in the final set of images does not have much effect on whether responsive images can be returned to a user—a user will likely be happy with either image, given the strong visual similarity. Therefore, in some implementations, only one of them is included in the final image selection.

The yield is maximized iteratively to determine the optimal value for each selection flag $s_i$. In each iteration and for each node, $\Delta_{yi}$ (the change in the yield due to toggling node i) is calculated. The node i is toggled with a probability of $(\Delta_{yi})(\text{change\_probability\_factor})$ if $\Delta_{yi}$ is positive. The change_probability_factor is a constant with a predetermined value. The constant is selected to convert the value for $\Delta_{yi}$ into a probability. The iterations terminate when either a specified maximum number of iterations is reached or when no nodes with positive $\Delta_{yi}$ exist (e.g., no change to the selection flag for an image increasing the yield for the graph). The $s_i$ values for the optimal yield are stored and include the selection flags for the images in the collection of images, where those images having a selection flag value of 1 are included in the final image selection.

As shown in FIG. 2, the system calculates 218 a set of n-grams, having corresponding n-gram scores, for each image using the image affinity and the image metadata. In particular, for each image, a set of n-grams and associated n-gram scores are calculated from n-grams for visually similar images using the image metadata and image affinity.

For each image, a set of n-grams is computed individually. An n-gram is a sequence of n tokens, for example, n-words. The set of n-grams can include n-grams of different orders (number of tokens) from 1 to N. An n-gram exists for an image, for example, if that n-gram appears in at least one query phrase having the specified threshold number of clicks or if the n-gram appears in a sufficient number of image referrers (web pages that contain the image). The click and referrer information is part of the metadata identified for each image of the group of images, as described above. Other sources of n-grams can also be used, for example, n-grams can be derived from labels associated with an image or other metadata for the image.

The image affinity between images i and j, calculated above, is written as $a_{ij}$. A count of a number of images within a neighborhood of an image i can be defined as $N_i := \text{Sum}_j(a_{ij})$ where the neighborhood is defined by images having a non-zero affinity with image i. Thus, the neighborhood includes images j within a specified number of hops from image i where each affinity $a_{ij}$ is non-zero. For each n-gram k, a 'count' C of images is calculated for images identified as in the neighborhood that are associated with the n-gram:

$$C_{ik} := \text{Sum}_{j \text{ has n-gram } k}(a_{ij}).$$

The score of an n-gram is then defined as: $w_{ik} := \max(0, (C_{ik}-1)/C_i)$. The score for an n-gram is non-zero if at least two images in the neighborhood are associated with (e.g., 'have') the n-gram. The n-grams having a weight of zero can be filtered out as spurious (i.e. unconfirmed) n-grams. The score for a given n-gram will converge toward 1 as the number of images in the neighborhood as well as the fraction of images that 'have' the n-gram increases. In addition, the score for an n-gram k can be positive even if image i was not initially associated with the n-gram, for example, when images visually similar to the image are associated with the n-gram. Together, this ensures that images have as many high quality (i.e. confirmed) n-grams as possible.

A final searchable index is generated 220 from the images in the final image selection (e.g., as described above using a kd-tree). The final searchable index is an index of local descriptors, for example, as described above with reference to FIGS. 3-5. The system can also maintain data associating images whose descriptors are in the final searchable index with the n-grams identified for the image. The new searchable index can be used to identify, in response to an image query, one or more images matching local descriptors in the index. Once the images are identified, the n-grams can be retrieved according to the stored data. The final searchable index and n-gram association data can be used to respond to image queries, for example, as described below with respect to FIGS. 6-8.

Figure 6:
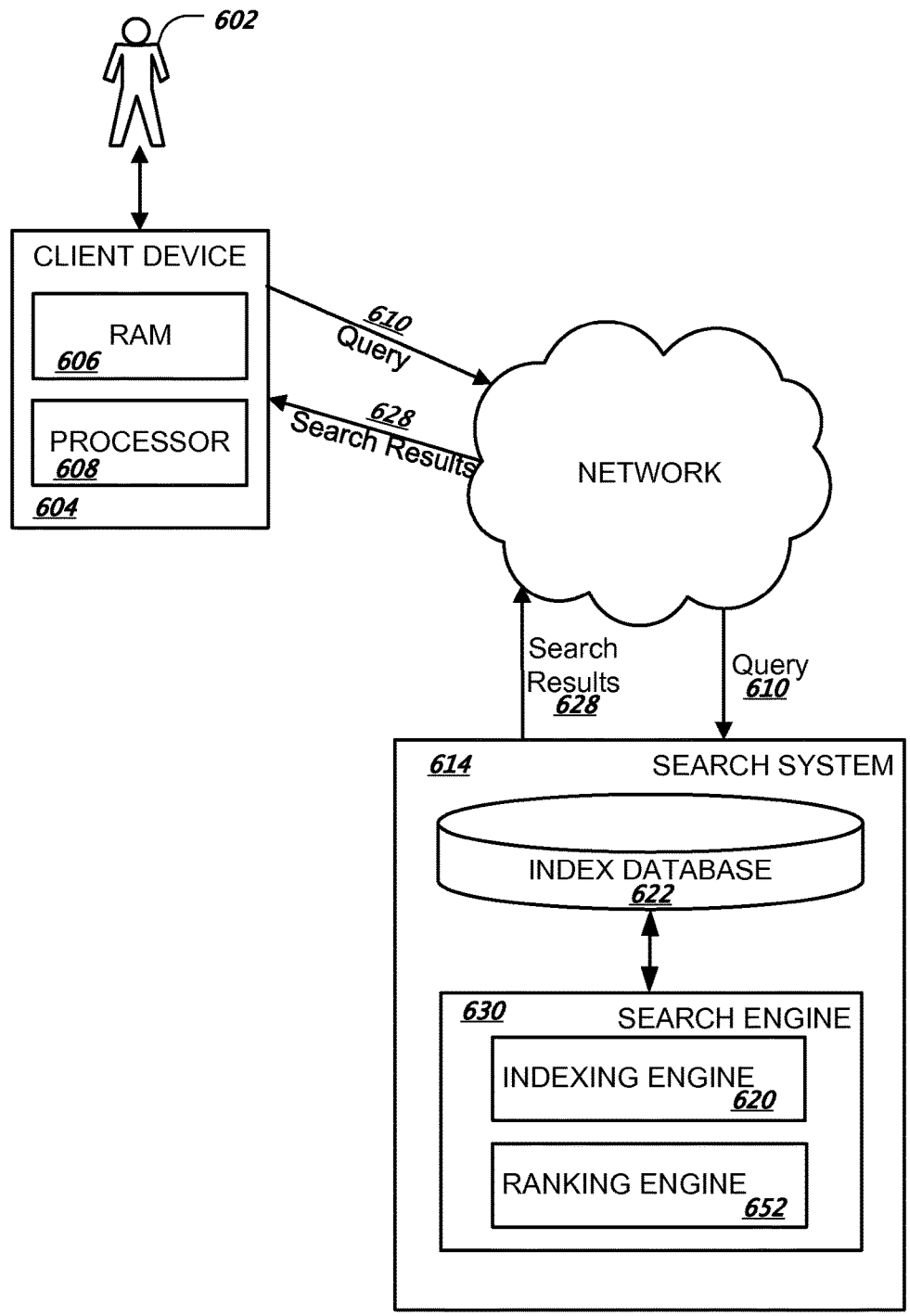
FIG. 6 illustrates an example search system for providing search results.

FIG. 6 illustrates an example search system 614 for providing search results, e.g., images, documents, videos, multimedia content, etc. relevant to submitted queries as can be implemented in an Internet, an intranet, or other client and server environment. The search system 614 is an example information retrieval system. In some implementations, the search system 614 is specialized to search particular kinds of content, e.g., images. In some other implementations, the search system 614 searches content in general.

A user 602 interacts with the search system 614 through a client device 604. For example, the client device 604 can be or can include a computer (e.g., a personal computer, a mobile phone, etc.) coupled to the search system 614 through a wired or wireless local area network (LAN) or wide area network (WAN), e.g., the Internet. In some implementations, the search system 614 and the client device 604 are both implemented in the same machine. For example, a user can install a desktop search application on the client device 604. The client device 604 will generally include a random access memory (RAM) 606 and a processor 608.

A user 602 submits a query 610 to a search engine 630 within the search system 614. The query can be, for example, an image query. An image query is a query that is an image. When the user 602 submits a query 610, the query 610 is transmitted through a network to the search system 614. The search system 614 can be implemented as, for example, computer programs running on one or more computers in one or more locations that are coupled to each other through a network. In some implementations, the search system 614 includes an index database 622 and a search engine 630. The index database 622 can be built, for example, using the techniques described above with reference to FIGS. 2-5 and with regard to the indexer 108 of FIG. 1. Alternatively, or additionally, the index database 622 can be a conventional search database built, for example, using conventional techniques. The search system 614 responds to the query 610 by generating search results 628, which are transmitted through the network to the client device 604 in a form that can be presented to the user 602 (e.g., in a search results web page to be displayed in a web browser running on the client device 604). For example, the search results can include images, documents, and other results responsive to the user query 610.

When the query 610 is received by the search engine 630, the search engine 630 identifies search results that match the query 610. When a query is an image, the search engine 630 can identify search results that match the query 610 by identifying visually similar images for the image query, for example, as described above with reference to FIGS. 2-5 and returning one or more of the images as search results. Alternatively or additionally, the search engine can identify a textual query corresponding to the image and identify search results responsive to the textual query, for example, using conventional search techniques. Identifying the textual query is described in more detail below, with reference to FIGS. 7-8.

The search engine 630 will generally include an indexing engine 620 that indexes content found by the search system 614, for example, documents found while crawling the Internet, an index database 322 that stores the index information, and a ranking engine 652 (or other software) to rank the search results that match the query 610, for example, according to a result score associated with each result by the engine 630. The result score can be a query-independent measure of the quality of the result, a query-specific measure of how well the result matches the query, or a score derived from both a query-independent measure and a query specific measure. The search engine 630 transmits the search results 628 through the network to the client device 604 for presentation to the user 602.

Figure 7:
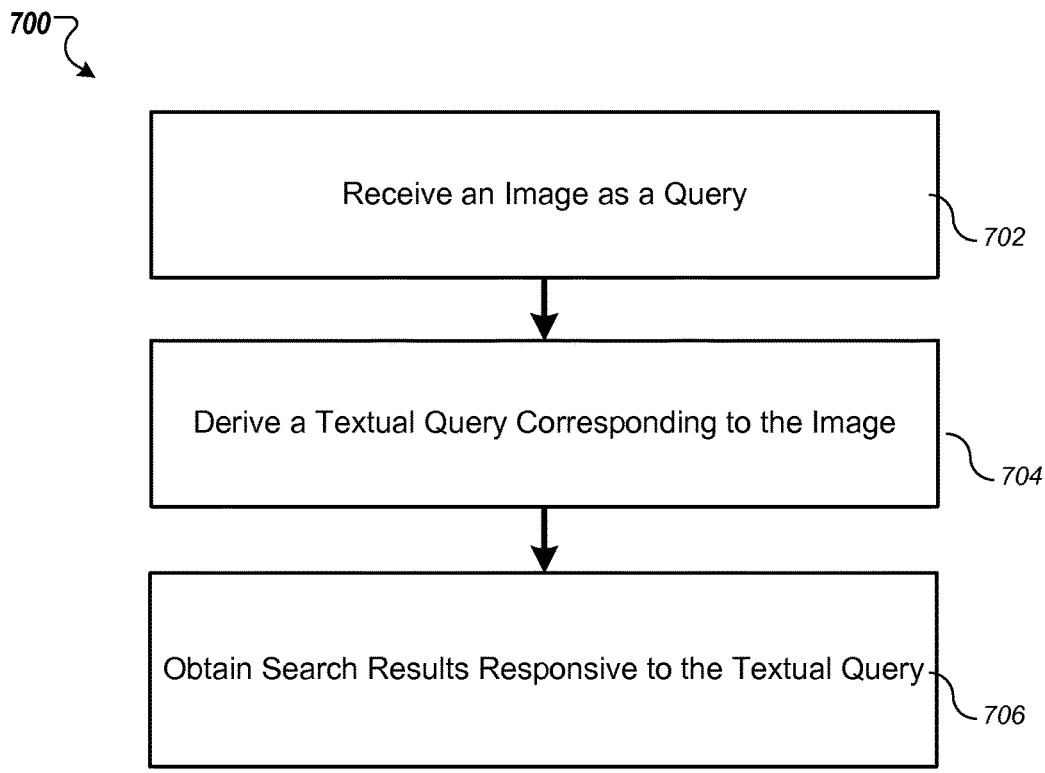
FIG. 7 is a flow chart of an example method for obtaining search results responsive to an image query received from a user.

FIG. 7 is a flow chart of an example method 700 for obtaining search results responsive to an image query received from a user. For convenience, the example method 700 will be described in reference to a system including one or more computing devices that performs the method 700. The system can be, for example, the search system 614 described above with reference to FIG. 6.

The system receives 702 an image as a query. The system can receive the image, for example, when a user submits the image as a search query. For example, a user can submit an image captured with a camera on a device. In some implementations, the device is a mobile device.

The system derives 704 a textual query corresponding to the image. The textual query is an n-gram that is considered a description of the image. An example method for deriving an n-gram that describes an image is described below, with reference to FIG. 8.

The system obtains 706 search results responsive to the textual query. The system identifies responsive search results that best match the textual query, for example, using conventional techniques.

In some implementations, once the system obtains the search results, the system presents the search results to the user, for example, as described above with reference to FIG. 6. In some implementations, the system also obtains search results that are visually similar to the image query and presents those search results with the search results responsive to the textual query. The system can obtain the visually similar search results, for example, as described above with reference to FIGS. 2-5.

Figure 8:
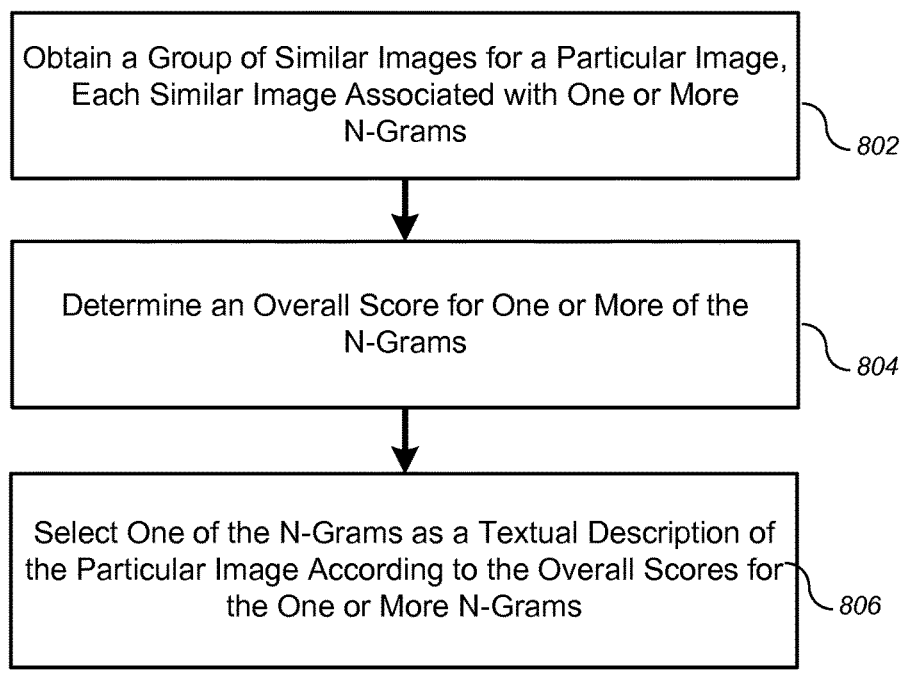
FIG. 8 is a flow chart of an example method for selecting a textual description of an image.

FIG. 8 is a flow chart of an example method 800 for selecting a textual description of an image. For convenience, the example method 800 will be described in reference to a system including one or more computing devices that performs the method 800. The system can be, for example, the search system 614 described above with reference to FIG. 6.

The system obtains 802 a group of similar images for a particular image. The system can obtain the group of similar images, for example, by querying an index that associates images with descriptors, for example the descriptor index described above with respect to FIG. 2. Querying the index can include submitting a query vector for each local descriptor of the query image. Additionally, each similar image in the index is associated with one or more n-grams. The association can be stored, for example, in the final searchable index described above with reference to FIG. 2. In some implementations, each n-gram has an image-specific score for each image with which it is associated. The n-grams and scores can be identified for the images, for example, as described above with respect to FIG. 2.

The system determines 804 an overall score for one or more of the n-grams. The system determines the overall score by combining the image-specific scores for each n-gram.

For example, the system can determine the overall score for a given n-gram k according to the following formula:

$$\text{overall score}_k = c^{N-1} \times \sum_{\text{score}_{k,i} > \text{threshold}} \frac{\text{score}_{k,i}}{\text{number of images}},$$

where N is the order of the n-gram k (e.g., the number of words in the n-gram), the $\text{score}_{k,i}$ is the image specific score for n-gram k and image i, and the number of images is the number of images in the group of similar images. The threshold is determined, for example, empirically to filter out scores that are considered too low to be counted. The variable c is a constant chosen empirically, for example, to increase the score of higher order n-grams, in effect, boosting n-grams that include more words and thus are less likely to occur a-priori.

In some implementations, the system filters the n-grams, e.g., by setting the score of undesired n-grams to a predetermined value such as zero. For example, n-grams that contain only non-alphabetical characters, n-grams that begin or end with a stop word, or n-grams that contain a word on a blacklist can have their scores set to zero. The stop words are words that the system considers too general to add meaning to user queries. Example stop words include "the," "a," "and," and file extensions, e.g., ".jpg." The system can determine whether an n-gram contains a stop word, for example, by comparing the terms of the n-gram to a predefined list of stop words. The blacklist can include, for example, terms that have been predetermined to be offensive, such as sexual terms or derogatory terms.

The system selects 806 one of the n-grams as a textual description of the particular image. The system selects the selected n-gram according to the overall scores for the n-grams.

For example, in some implementations, the system considers the n-grams in order of increasing N. The system beings by considering the overall scores for all n-grams for the group of similar images where N=1. The system selects the n-gram that has the highest score of all of the n-grams where N=1 as the current best n-gram.

The system then considers other highest scoring n-grams for each n-gram order N in increasing order. If the highest scoring n-gram has an overall score higher than the current best n-gram, the system selects the highest scoring n-gram for the current n-gram order as the current best n-gram.

If no n-gram for the current n-gram order has a score higher than the overall score for the current best n-gram, the system determines whether any superstrings of the current best n-gram are included in the n-grams for the current value of N. If the n-grams for the current value of N include one or more superstrings of the current best n-gram, the system determines whether the overall score for the highest scoring superstring is above an acceptance threshold. If so, the superstring becomes the current best n-gram. Otherwise, the current best n-gram is unchanged. In some implementations, when the system selects the superstring as the current best n-gram, the system associates the score of the sub string of the superstring with the superstring as the score of the superstring.

Once the n-grams for all possible values of N have been considered, the system selects the current best n-gram as the textual description of the particular image.

For example, suppose the system has identified the following n-grams for a group of similar images, along with the following overall scores for each n-gram:
"Eiffel": 0.7
"Paris": 0.6
"Trip": 0.2
"Landmark": 0.1
"Eiffel Tower": 0.8
"Paris Trip": 0.3
"of Paris": 0.25
"Paris Tower": 0.2
"Landmarks of Paris": 0.2
"from Paris Trip": 0.18
"Eiffel Tower at": 0.15
"Pictures from Paris Trip": 0.12
"Eiffel Tower at Night" 0.11.

In this example, the system can determine the textual description of the particular image as follows. The system first determines that the best 1-gram is the phrase "Eiffel" with an overall score of 0.7. Therefore, the system selects "Eiffel" as the current best n-gram with score 0.7. The system then determines that the phrase "Eiffel tower" is the best 2-gram with a score of 0.8 and selects "Eiffel tower" as the current best n-gram with a score of 0.8.

The system then determines that the highest scoring 3-gram is "Landmarks of Paris" with a score of 0.2. The system determines that 0.2 is less than the overall score of the current best n-gram (0.8). Therefore, the system does not update the current best n-gram to be "Landmark of Paris." However, the system also determines that "Eiffel tower at," a superstring of the current best n-gram "Eiffel tower" has a score of 0.15 which is above a specified acceptance threshold. Therefore, the system selects the 3-gram "Eiffel tower at" as the current best n-gram with a score of 0.8 (corresponding to the score for "Eiffel tower.").

The system then determines that the best 4-gram is the phrase "Pictures from Paris Trip" with a score of 0.12; however, this is less than the score of the current best n-gram (0.8). Therefore, the system does not update the current best n-gram to be "Pictures from Paris Trip." However, the system also determines that "Eiffel tower at night" is a superstring of the current best n-gram "Eiffel tower at" and has a score of 0.11 which is above the acceptance threshold. Therefore, the system selects the 4-gram "Eiffel tower at night" as the new current best n-gram with a score of 0.8.

In this example, the system then selects "Eiffel tower at night" as the textual description of the particular image, because it is the current best n-gram after all n-grams have been considered.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
   receiving an image as a query from a user device associated with a user;
   deriving a textual query corresponding to the received image, wherein deriving the textual query for the image includes:
      using the image to determine a group of images that are similar to the received image;
      for each similar image of the group of similar images, identifying one or more n-grams associated with the similar image; and
      selecting one or more of the identified n-grams as a textual query for the received image;
   obtaining search results responsive to the textual query; and
   providing for presentation on the user device one or more of the obtained search results.

2. The method of claim 1, wherein the textual query comprises an n-gram considered a description of the received image.

3. The method of claim 1, wherein the image is received from a mobile device.

4. The method of claim 1, where deriving the textual query corresponding to the image comprises:
   determining an overall score for each of the one or more of the n-grams; and
   selecting one or more of the n-grams as a description of the particular image based on the respective overall scores.

5. The method of claim 1, wherein obtaining a group of similar images for a particular image comprises querying an index that associates images with descriptors using a vector of for each local descriptor of the image.

6. The method of claim 1, wherein the search results are image search results comprising a group of one or more images.

7. The method of claim 1, further comprising:
   obtaining additional search results that are visually similar to the image query; and
   providing one or more of the additional search results for presentation with the search results.

8. A system comprising:
   one or more computers operable to perform operations comprising:
      receiving an image as a query from a user device associated with a user;
      deriving a textual query corresponding to the received image, wherein deriving the textual query for the image includes:
         using the image to determine a group of images that are similar to the received image;
         for each similar image of the group of similar images, identifying one or more n-grams associated with the similar image; and
         selecting one or more of the identified n-grams as a textual query for the received image;
      obtaining search results responsive to the textual query; and
      providing for presentation on the user device one or more of the obtained search results.

9. The system of claim 8, wherein the textual query comprises an n-gram considered a description of the received image.

10. The system of claim 8, where the image is received from a mobile device.

11. The system of claim 8, where deriving the textual query corresponding to the image comprises:
    determining an overall score for each of the one or more of the n-grams; and
    selecting one or more of the n-grams as a description of the particular image based on the respective overall scores.

12. The system of claim 8, wherein obtaining a group of similar images for a particular image comprises querying an index that associates images with descriptors using a vector of for each local descriptor of the image.

13. The system of claim 8, where the search results are image search results comprising a group of one or more images.

14. The system of claim 8, wherein the one or more computers are further operable to perform operations comprising:
    obtaining additional search results that are visually similar to the image query; and
    providing one or more of the additional search results for presentation with the search results.

15. A non-transitory computer-readable storage medium storing instructions that, when executed by data processing apparatus cause the data processing apparatus to perform operations comprising:
    receiving an image as a query from a user device associated with a user;
    deriving a textual query corresponding to the received image, wherein deriving the textual query for the image includes:
       using the image to determine a group of images that are similar to the received image;
       for each similar image of the group of similar images, identifying one or more n-grams associated with the similar image; and
       selecting one or more of the identified n-grams as a textual query for the received image;
    obtaining search results responsive to the textual query; and
    providing for presentation on the user device one or more of the obtained search results.

16. The non-transitory computer-readable storage medium of claim 15, wherein the textual query comprises an n-gram considered a description of the received image.

17. The non-transitory computer-readable storage medium of claim 15, where the image is received from a mobile device.

18. The non-transitory computer-readable storage medium of claim 15, where deriving the textual query corresponding to the image comprises:
  determining an overall score for each of the one or more of the n-grams; and
  selecting one or more of the n-grams as a description of the particular image based on the respective overall scores.

19. The non-transitory computer-readable storage medium of claim 15, wherein obtaining a group of similar images for a particular image comprises querying an index that associates images with descriptors using a vector of for each local descriptor of the image.

20. The non-transitory computer-readable storage medium of claim 15, where the search results are image search results comprising a group of one or more images.

\* \* \* \* \*